(12) United States Patent
Morimura (10) Patent No.: US 9,878,414 B2
(45) Date of Patent: Jan. 30, 2018

(54) CUTTING FLUID TANK

(71) Applicant: OKUMA CORPORATION, Niwa-gun (JP)

(72) Inventor: Shoichi Morimura, Niwa-gun (JP)

(73) Assignee: OKUMA CORPORATION, Niwa-gun (JP)

( * ) Notice: Subject to any disclaimer, the term of this patent is extended or adjusted under 35 U.S.C. 154(b) by 0 days.

(21) Appl. No.: 14/976,467

(22) Filed: Dec. 21, 2015

(65) Prior Publication Data
US 2016/0184946 A1 Jun. 30, 2016

(30) Foreign Application Priority Data

Dec. 25, 2014 (JP) .................................. 2014-262042

(51) Int. Cl.
| | |
|---|---|
| *B23Q 11/00* | (2006.01) |
| *B01F 5/02* | (2006.01) |
| *B23Q 11/10* | (2006.01) |
| *B24B 55/02* | (2006.01) |
| *B23B 27/10* | (2006.01) |

(Continued)

(52) U.S. Cl.
CPC ........ *B23Q 11/0057* (2013.01); *B01F 5/0206* (2013.01); *B05B 3/06* (2013.01); *B23B 27/10* (2013.01); *B23Q 11/0042* (2013.01); *B23Q 11/1069* (2013.01); *B24B 55/02* (2013.01); *B24B 55/03* (2013.01); *B23B 2250/12* (2013.01); *Y10T 137/85954* (2015.04); *Y10T 137/86372* (2015.04)

(58) Field of Classification Search
CPC ..... Y10T 137/86372; Y10T 137/85954; B01F 5/0206; B05B 3/06; B23Q 11/1069; B23Q 11/0057; B23B 2250/12; B23B 27/10; B24B 55/02; B24B 55/03
See application file for complete search history.

(56) References Cited

U.S. PATENT DOCUMENTS

| | | | | |
|---|---|---|---|---|
| 4,930,531 A | * | 6/1990 | Ballu .................... | B05B 3/06 134/167 R |
| 5,221,469 A | * | 6/1993 | Nehls ................... | B01D 29/395 210/167.04 |

(Continued)

FOREIGN PATENT DOCUMENTS

| | | |
|---|---|---|
| JP | 02-106248 A | 4/1990 |
| JP | 4-4235 U | 4/1992 |

(Continued)

*Primary Examiner* — Atif Chaudry
(74) *Attorney, Agent, or Firm* — Locke Lord LLP (57) ABSTRACT

A cutting fluid tank includes: a fluid ejection apparatus configured to eject fluid toward cutting fluid containing chips and to be capable of varying at least one of a direction and a position of ejection with time in an interior of a tank body configured to store the cutting fluid containing the chips flowed from a work portion of a machine tool. The fluid ejection apparatus includes an ejection head having an ejection port rotatable about an axis of rotation. The ejection port is at a twisted position with respect to the axis of rotation, and the ejection head is rotated by a reaction force of the fluid ejected from the ejection port. Part of the cutting fluid stored in the cutting fluid tank is used as the fluid to be ejected from the ejection port.

20 Claims, 3 Drawing Sheets

(51) Int. Cl.
    *B05B 3/06*    (2006.01)
    *B24B 55/03*   (2006.01)

(56) References Cited

U.S. PATENT DOCUMENTS

| | | | | |
|---|---|---|---|---|
| 5,301,702 | A * | 4/1994 | McKinney | B05B 3/06 134/107 |
| 5,454,937 | A * | 10/1995 | Lewandowski | B01D 17/0211 210/104 |
| 6,096,198 | A * | 8/2000 | Underhill | B01D 17/0202 210/123 |
| 6,488,402 | B1 * | 12/2002 | King | B01F 3/0446 366/173.2 |
| 6,536,468 | B1 * | 3/2003 | Wilmer | B01F 3/0857 137/544 |
| 6,571,959 | B1 * | 6/2003 | Moore | B01D 33/15 210/167.09 |
| 2001/0038572 | A1 * | 11/2001 | Dupre | B05B 3/06 366/137 |
| 2002/0066474 | A1 * | 6/2002 | White | B05B 3/027 134/95.2 |
| 2010/0051071 | A1 * | 3/2010 | Calhoun | A47L 15/23 134/198 |
| 2014/0124418 | A1 * | 5/2014 | Ishihara | B23Q 11/1069 210/86 |
| 2014/0231546 | A1 * | 8/2014 | Etschel | E21B 37/08 239/245 |

FOREIGN PATENT DOCUMENTS

| | | |
|---|---|---|
| JP | 06-042045 U | 6/1994 |
| JP | 07-007855 U | 2/1995 |
| JP | 2004-114221 A | 4/2004 |

\* cited by examiner

CUTTING FLUID TANK

BACKGROUND OF THE INVENTION

1. Field of the Invention

The present invention relates to a cutting fluid tank used for a machine tool such as a machining center and a turning machine.

2. Description of the Background Art

For example, in a machine tool configured to perform a cutting work such as a machining center and a turning machine, cutting fluid is generally used for a purpose of lubrication and cooling of tools and discharge of chips.

The cutting fluid discharged toward a work chamber of the machine tool by a cutting fluid supply pump is discharged to outside the work chamber together with chips scraped out from the work. The discharged cutting fluid flows into a tank body of a cutting fluid tank and stores temporarily after the chips mixed therein have been separated and removed by a chip conveyor or a filter, and is supplied therefrom to the work chamber again by the cutting fluid supply pump.

However, the chips mixed in the cutting fluid cannot be separated and removed by 100% depending on the chip conveyor or the filter, and some quantity of chips flow into the tank body of the cutting fluid tank together with the cutting fluid. However, if the chips entered the tank body are sucked into devices such as the cutting fluid supply pump, the devices may be damaged or may break down.

In addition, the chips flowed together with the cutting fluid are gradually accumulated in the tank body, whereby an effective capacity of the tank body, that is, a capacity for storing the cutting fluid itself is reduced. Therefore, when a large quantity of the cutting fluid is supplied toward the work chamber, a problem of exhaustion of the cutting fluid in the interior of the tank body may arise.

In addition, the chips are settled and accumulated on a bottom portion of the tank body, the state and the quantity of accumulation are difficult to figure out at first glance and a lot of time and effort are required for removing the accumulated chips.

Accordingly, installing chip separating apparatus such as a centrifuge or a magnet separator in a predetermined position in the interior of the tank body and separating and removing the chips from the cutting fluid are performed.

However, the chips contained in the cutting fluid are spread over the entire area of the tank body, and is settled and accumulated on the bottom portion thereof. Therefore, even though an attempt is made to collect the chips by the chip separating apparatus, only part of the chips existing in a peripheral area of the apparatus. Therefore, the chips accumulated in other areas in the tank body cannot be collected.

If a flow of the cutting fluid in the interior of the tank body is fast, since the chips mixed in the cutting fluid move with the flow of the cutting fluid, accumulation of the chips on the bottom portion of the tank body may be prevented or alleviated. However, since the quantity of the cutting fluid flowing in the tank body varies in accordance with the quantity of the cutting fluid required for machining of the work, there are cases where a flow rate is not stable and becomes slow or where the flow is stopped.

In addition, the tank body of the cutting fluid tank is required to secure a maximum capacity with respect to an installation space, and in addition, the devices such as the chip conveyor are disposed in many cases, a structure or a shape is subject to various restraints. Therefore, a narrow portion which is complex and indented portions are formed in the interior of the tank body. Consequently, there arises a problem that the cutting fluid containing the chips stays in such portions and thus the chips are accumulated on the bottom portion.

In the related art, several devices configured to prevent the chips from accumulating in the tank body of the cutting fluid tank are proposed.

For example, a cutting fluid tank described in JP-UM-A-6-42045 includes in a tank body: a central separating plate configured to partition the interior thereof into a front part and a rear part, chip trapping pocket located at one corner portion, and two front and rear movable plates movable along both sides of the central separating plate along the central separating plate. Each of the movable plate includes a nozzle configured to eject cutting fluid so as to form a circulating flow of the cutting fluid in the interior of the tank body, and a scraping plate configured to scrape chips accumulated on a bottom portion of the tank body.

JP-UM-A-4-42350 discloses a cutting fluid tank configured to eject the cutting fluid pumped up from the interior of the tank body through the nozzle so as to run along a wall surface of the tank body to form an eddy current in cutting fluid in the interior of the tank body, so that chips are prevented from accumulating on a bottom portion of the tank body. JP-UM-A-7-7855 discloses a cutting fluid tank having the same configuration as JP-UM-A-4-42350. However, in the cutting fluid tank of this disclosure, chips collected at a center portion of a tank body by an eddy current are pumped up with a pump with cutting fluid, and causes the pumped cutting fluid containing the chips to pass through a filter and to be returned again to the tank body.

In JP-A-2004-114221 and JP-A-2-106248, installing a screw for stirring cutting fluid in an interior of a tank body of a cutting fluid tank to prevent chips from accumulating on a bottom portion of the bank body is disclosed.

SUMMARY OF THE INVENTION

However, the cutting fluid tank disclosed in JP-UM-A-6-42045 is limited to that having the tank body with a simple internal structure and cannot be applied to a case where, for example, a chip conveyor or the like is installed and complex and indented portions are formed.

In the case of the devices configured to form an eddy current of the cutting fluid in the interior of the tank body like the cutting fluid tanks disclosed in JP-UM-A-4-42350 and JP-UM-A-7-7855, if the chip conveyor or the like is installed in the interior of the tank body, a flow is impaired thereby and, in addition, the flow of the cutting fluid may become constant. Therefore, a portion having a potential to allow the chips to accumulate therein may be formed.

Moreover, in the case where the screw is used like the cutting fluid tanks as disclosed in JP-A-2004-114221 and JP-A-2-106248, the effect is limited to a certain range of the tank body, and there is a problem of inability to prevent the chips from accumulating in a wide range within the tank body.

It is an object of the invention to provide a cutting fluid tank configured to effectively prevent accumulation of chips into an interior of a tank body, and hence requires less burden of maintenance such as cleaning, and has an ability to maintain an effective capacity of the tank body.

In order to achieve the above-described object, embodiments of the invention are configured as follows.

1) A cutting fluid tank including a fluid ejection device configured to eject fluid toward cutting fluid containing chips and to be capable of varying at least one of a direction and a position of ejection with time in the interior of a tank body configured to store the cutting fluid containing the chips flowed from a work portion of a machine tool.

2) The cutting fluid tank of 1) described above, wherein the fluid ejection device includes an ejection head having an ejection port and provided in the interior of the tank body so as to allow predetermined motion, and at least one of a direction and a position of the ejection port is varied with time by motion of the ejection head.

3) The cutting fluid tank of 2) described above wherein a reaction force of fluid ejected from the ejection port is used as at least part of a drive force that moves the ejection head.

4) The cutting fluid tank of 3) described above, wherein the motion of the ejection head is a rotary motion about a predetermined axis of rotation, the ejection port is at a twisted position with respect to the axis of rotation of the ejection head, and the ejection head is rotated by the reaction force of fluid ejected from the ejection port.

5) The cutting fluid tank of 3) described above, wherein the motion of the ejection head is a reciprocatory pivotal motion within a predetermined pivotal angle, a biasing device configured to bias the ejection head toward one of the directions of pivotal motion is provided, the ejection port is provided so as to allow the reaction force of ejected fluid to act in a direction opposite to that of the biasing force applied by the biasing device, and the ejection head is brought into reciprocatory pivotal motion by a quantity of fluid ejected from the ejection port being varied with time.

6) The cutting fluid tank of 3) wherein the motion of the ejection head is reciprocatory motion or cyclical motion on a predetermined locus, the ejection head includes two or more ejection ports different in direction from each other, the ejection head is brought into reciprocatory motion or cyclical motion on the locus by varying a ratio of the quantities of fluid to be ejected from the respective ejection ports with time.

7) The cutting fluid tank of 3) described above, wherein the motion of the ejection head is cyclical motion on the predetermined locus, the ejection port is installed in the direction not orthogonal to the locus, and the ejection head is brought into cyclical motion by the reaction force of fluid ejected from the ejection port.

8) The cutting fluid tank of 2) described above, wherein the drive force for causing the ejection head into motion is generated by an external drive source.

9) The cutting fluid tank of 8) described above, wherein the fluid to be ejected from the ejection port is part of the cutting fluid stored in the tank body, and the external drive source is a hydraulic motor operated by a flowing force of the cutting fluid supplied from the tank body into the ejection port.

10) The cutting fluid tank of any one of 1) to 8), wherein the fluid ejected by the fluid ejection device is part of the cutting fluid stored in the tank body.

11) The cutting fluid tank of any one of 1) to 8), wherein the fluid ejected by the fluid ejection device is air.

In the cutting fluid tank of 1) described above, when the fluid is ejected from the fluid ejection device toward the cutting fluid containing the chips in the interior of the tank body, the chips accumulated on the bottom portion of the tank body are blown out and raised in the cutting fluid within a range in which the jet flow hits. The raised chips are fed downstream along with the entire flow of the cutting fluid in the interior of the tank body, that is, a flow of the cutting fluid containing the chips from an inflow position into the interior of the tank body to the cutting fluid supply device to a work portion of a machine tool. When the fluid ejection device varies the direction and/or the position of ejection of the fluid with time, the chips accumulated on the bottom portion are raised by the jet flow in a wide range in the interior of the tank body, and is collected to the downstream side in accordance with the entire flow of the cutting fluid. Therefore, by providing, for example, a chip separating device including a centrifuge or a magnet separator on the downstream side in the tank body, more preferably, in the vicinity of the cutting fluid supply device, most part of the chips within the interior of the tank body are collected by the chip separating device, and is separated and removed here from the cutting fluid.

The fluid ejection device is not configured to fixedly install a number of the ejection ports such as the nozzles in the interior of the tank body, but is configured to vary the direction and the position of the ejection port with time. Therefore, installation of at least one fluid ejection device is sufficient, and in addition, the total quantity of fluid to be ejected does not become enormous, and thus a pump required for ejecting fluid does not have to be increased in size.

Therefore, according to the cutting fluid tank of 1) described above, since accumulation of the chips in the interior of the tank body can be prevented effectively in comparison with the related art, a burden of maintenance such as cleaning is reduced, and a desired quantity of cutting fluid may be stably supplied to the machine tool while maintaining the effective capacity of the tank body. According to the cutting fluid tank of 1) described above, the above-described effects are achieved without requiring a large scale equipment and cost.

According to the cutting fluid tank of 2) described above, since the fluid ejection device is provided with a movable ejection head having the ejection port, a structure that causes variations with time of the direction and/or the position of the ejection port can be simplified, and hence a cost reduction is enabled.

According to the cutting fluid tank of 3) described above, since the reaction force of fluid ejected from the ejection port is used as a drive force for bringing the ejection head into motion, a cost increase caused by the usage of the external drive source is reduced, and the configuration of the fluid ejection device may be simplified.

According to the cutting fluid tank of 4) described above, since the direction of the ejection port is varied by 360 degrees in association with the rotation of the ejection head, the chips accumulated over the wide range in the interior of the tank body may be blown out and raised by the jet flow and thus an extremely high chip accumulation preventing effect is achieved. The cutting fluid tank of 4) described above is cost efficient because the external drive source is not required at all for rotating the ejection head.

According to the cutting fluid tank of 5) described above, since the direction of the ejection port is varied within the range of the pivotal angle of the ejection head, for example, the device can be installed, for example, in a relatively small space such as a corner portion in the interior of the tank body, blow out and raise the chips accumulated in such a space efficiently with a jet flow. Therefore, the jet flow is used for preventing accumulation of the chips without waste. The cutting fluid tank of 5) described above is cost efficient because the external drive source is not required to pivot the ejection head.

According to the cutting fluid tank of 6) described above, the range of motion of the ejection port can be set further widely, so that the chips accumulated over the wide range in the interior of the tank body can be blown out and raised with the jet flow. The cutting fluid tank of 6) described above is cost efficient because the external power source is not required for the reciprocatory motion or the cyclical motion of the ejection head.

According to the cutting fluid tank of 7) described above, the cyclical motion of the ejection head with a simpler structure is enabled.

According to the cutting fluid tank of 8) described above, since the drive force of the ejection head is generated by the external drive source, the ejection head can be brought into motion stably without being affected by the quantity and the state of ejection of fluid from the ejection port.

According to the cutting fluid tank of 9) described above, since part of the cutting fluid in the interior of the cutting fluid tank is used as ejection fluid, preparation and supply of separate fluid are not necessary, and the configuration of the apparatus is further simplified, so that cost may be kept low.

In addition, the cutting fluid tank of 9) described above is cost efficient because the ejection head is driven by the hydraulic motor operated by a flowing force of the cutting fluid supplied from the tank body to the ejection port.

According to the cutting fluid tank of 10) described above, since part of the cutting fluid in the interior of the cutting fluid tank is used as ejection fluid, preparation and supply of separate fluid are not necessary, and the configuration of the apparatus is further simplified, so that cost may be kept low.

According to the cutting fluid tank of 11) described above, since air is used as the ejection fluid, the chips blown out and raised by the jet flow can easily be dispersed in the cutting fluid, and thus accumulation of the chips can effectively be prevented.

DETAILED DESCRIPTION OF THE INVENTION

First Embodiment

Figure 1:
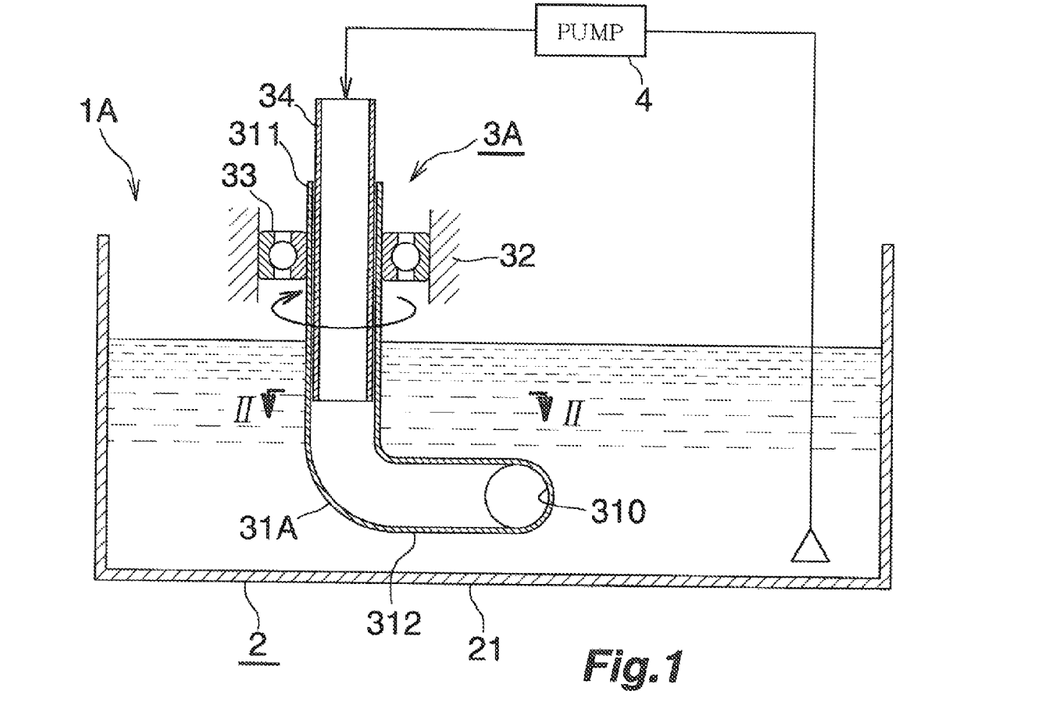
FIG. 1 is a schematic vertical cross-sectional view illustrating a cutting fluid tank according to a first embodiment.
Figure 2:
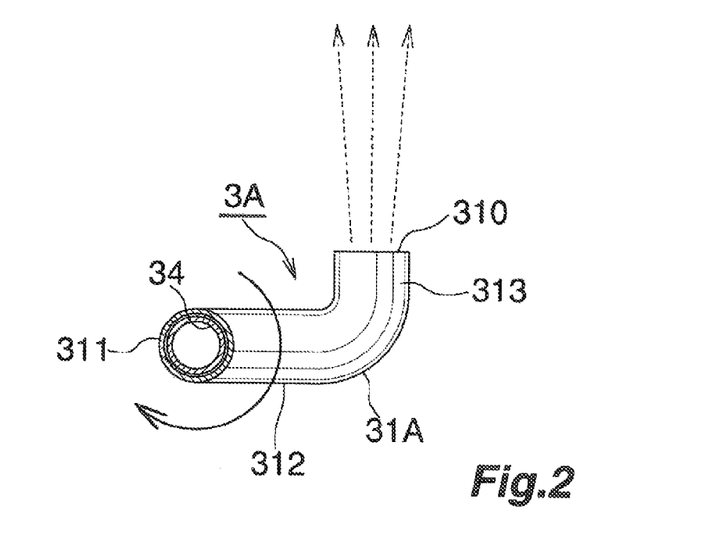
FIG. 2 is a horizontal cross-sectional view taken along a line II-II in FIG. 1.

FIG. 1 and FIG. 2 illustrate a first embodiment of the invention.

A cutting fluid tank (1A) of the embodiment is provided with a tank body (2) and a fluid ejection apparatus (3A) installed in the tank body (2).

Although illustration is omitted, the tank body (2) is arranged below a work chamber of a machine tool, and cutting fluid containing chips and discharged from the work chamber flows therein from a predetermined inflow position (for example, a cutting fluid outlet of a chip conveyor) via the chip conveyor or a filter.

A cutting fluid supply pump configured to supply the cutting fluid toward the work chamber of the machine tool is provided in the interior of the tank body (2), and a chip separating apparatus composed of a centrifuge, a magnet separator, or the like is installed at a predetermined position (preferably, a position in proximity to the cutting fluid supply pump).

Within the tank body (2), the cutting fluid containing the chips forms a flow directed from the inflow position toward the cutting fluid supply pump as a whole.

The fluid ejection apparatus (3A) includes an ejection head (31A) having an ejection port (310).

The ejection head (31A) includes a vertical cylindrical portion (311) provided inside a fixed retaining cylinder (32) via a bearing (33) so as to be rotatable about a vertical axis of rotation, a lower horizontal cylindrical portion (312) extending radially outward from a lower end of the vertical cylindrical portion (311); and a bent end portion (313) bent shortly from a distal end of the lower horizontal cylindrical portion (312) in a horizontal direction orthogonal to an axial direction of the lower horizontal cylindrical portion (312).

The ejection port (310) includes an opening of the bent end portion (313), and is at a twisted position with respect to the vertical axis of rotation of the ejection head (31A). The size and the shape of the ejection port (310) are set as needed so that a jet flow required for blowing out and raising the accumulated chips can be obtained.

Part of an ejection fluid supply tube (34) is inserted into inside of the vertical cylindrical portion (311) of the ejection head (31A). Part of the cutting fluid stored in the tank body (2) is pumped up into the ejection fluid supply tube (34) by a pump (4) and is supplied as ejection fluid. A centrifuge may be used as the pump (4), whereby damage or breakdown due to sucking of the chips contained in the cutting fluid may be avoided. The pump (4) may be used partly as the cutting fluid supply pump, and may eject part of the cutting fluid to be discharged as the ejection fluid.

A slight gap is provided between the vertical cylindrical portion (311) of the ejection head (31A) and the ejection fluid supply tube (34) so as to prevent the rotary motion of the vertical cylindrical portion (311) from being impaired. The cutting fluid as the ejection fluid flows toward the ejection port (310) at a distal end of the ejection head (31A) without flowing in the above-described gap by its inertia. However, in order to prevent a leakage of the ejection fluid further reliably by enhancing a sealing property between the vertical cylindrical portion (311) of the ejection head (31A) and the ejection fluid supply tube (34), a seal member such as a packing may be interposed between the vertical cylindrical portion (311) and the ejection fluid supply tube (34).

In the cutting fluid tank (1A) described above, accumulation of the chips on the bottom portion (21) in the interior of the tank body (2) is effectively prevented as follows:

If part of the cutting fluid in the interior of the tank body (2) is ejected from the ejection port (310) at the distal end of the ejection head (31A) by operating the pump (4) of the fluid ejection apparatus (3A), the ejection head (31A) is rotated about the vertical axis of rotation by a reaction force of the ejected cutting fluid. Accordingly, the direction of the ejection port (310) is varied in accordance with the velocity of rotation within a range of 360 degrees. The cutting fluid ejected from the ejection port (310) blows out and raises the chips accumulated on the bottom portion (21) over the wide range within the tank body (2). The raised chips are directed downstream with the entire flow of the cutting fluid, and is separated and removed from the cutting fluid in a chip separating apparatus. The cutting fluid from which the chips are separated and removed is supplied to the work chamber of the machine tool by the cutting fluid supply pump again.

Second Embodiment

Figure 3:
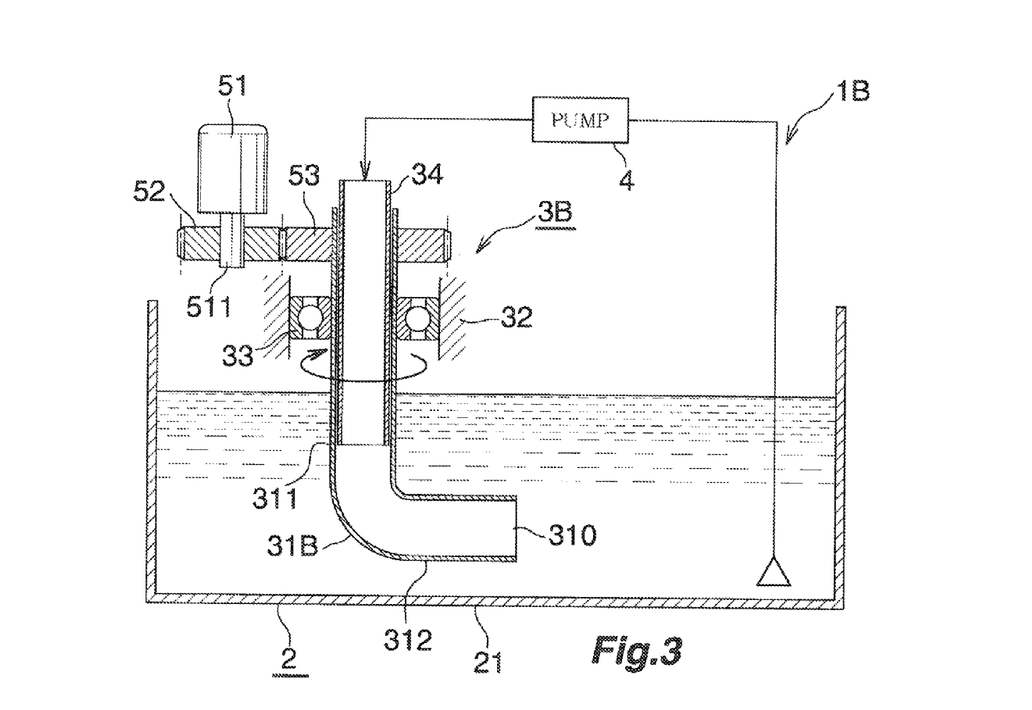
FIG. 3 is a schematic vertical cross-sectional view illustrating a cutting fluid tank according to a second embodiment.

FIG. 3 is a drawing illustrating a second embodiment of the invention.

A cutting fluid tank (1B) of the second embodiment is substantially the same as the cutting fluid tank (1A) of the first embodiment illustrated in FIG. 1 and FIG. 2 except for the following point:

In the cutting fluid tank (1B) of the second embodiment, an ejection head (31B) of a fluid ejection apparatus (3B) does not have a bent end portion, and an ejection port (310) is defined by an opening at a distal end of a lower horizontal cylindrical portion (312). Therefore, the ejection port (310) faces a direction orthogonal to a vertical axis of rotation of the ejection head (31B).

The ejection head (31B) is configured to be rotationary driven by a motor (51). Specifically, rotation of an output shaft (511) of the motor (51) is transmitted to the ejection head (31B), via a drive wheel (52) mounted on an output shaft (511) of the motor (51), and a driven wheel (53) mounted on an upper end portion of the ejection head (31B) so as to engage with the drive wheel (52), and the ejection head (31B) is rotated about the vertical axis of rotation.

Third Embodiment

Figure 4:
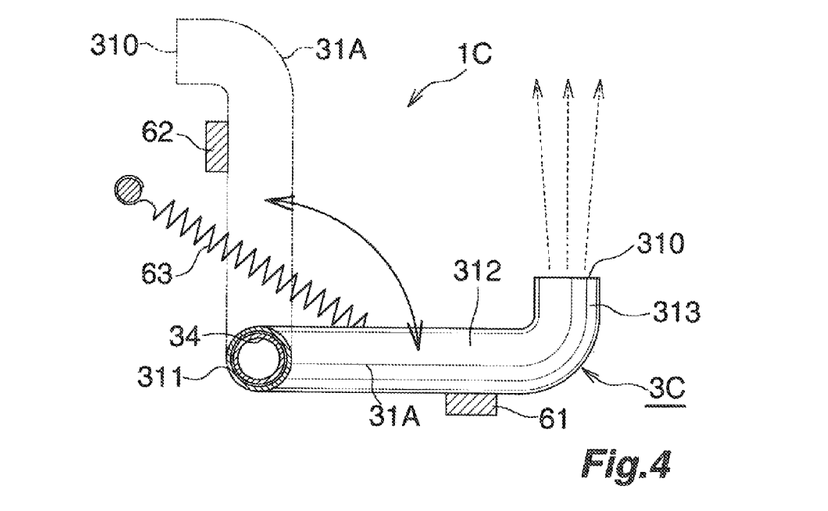
FIG. 4 is a schematic horizontal cross-sectional view illustrating a cutting fluid tank according to a third embodiment.

FIG. 4 is a drawing illustrating a third embodiment of the invention.

A cutting fluid tank (1C) of the third embodiment is substantially the same as the cutting fluid tank (1A) of the first embodiment illustrated in FIG. 1 and FIG. 2 except for the following point:

In the cutting fluid tank (1C) of the third embodiment, an ejection head (31A) of a fluid ejection apparatus (3C) is configured to be brought into reciprocatory pivotal motion within a predetermined pivotal angle. The ejection head (31A) is restrained in its pivotal angle to 90 degrees by two stoppers (61) and (62). The first stopper (61) is provided so as to come into contact with a side surface of a lower horizontal cylindrical portion (312) when the ejection head (31A) is at a pivotal position in which the ejection port (310) thereof is directed upward of FIG. 4 (the position indicated by a solid line in FIG. 4). The second stopper (62) is provided so as to come into contact with a side surface of the lower horizontal cylindrical portion (312) when the ejection head (31A) is at a pivotal position in which the ejection port (310) thereof is directed leftward of FIG. 4 (the position indicated by a chain line in FIG. 4). The pivotal angle of the ejection head (31A) is not limited to 90 degrees as illustrated, and may be set as needed in accordance with the condition of the position of installation.

The ejection head (31A) is biased counterclockwise in FIG. 4 by a compression coil spring (63). Other biasing devices may be used instead of the compression coil spring (63).

Furthermore, in this embodiment, a flow rate of the cutting fluid ejected from the ejection port (310) can be varied with time. This is achieved, for example, by operating a pump configured to pump up the cutting fluid in the interior of the tank body and supply the pumped up cutting fluid to the ejection head (31A) intermittently at regular time intervals, or by operating the pump so that an increase and a decrease of the flow rate are repeated by a flow rate control apparatus.

When the cutting fluid is not ejected from the ejection port (310), the ejection head (31A) is held at a position indicated by a chain line in FIG. 4 by a biasing force of the compression coil spring (63). However, when the cutting fluid is ejected from the ejection port (310), the ejection head (31A) comes to a position indicated by a solid line in FIG. 4 by being pivoted clockwise in FIG. 4 by a reaction force thereof. When ejection of the cutting fluid from the ejection port (310) is stopped or the flow rate is lowered, the ejection head (31A) is pivoted to the position indicated by the chain line in FIG. 4 again by a biasing force of the compression coil spring (63).

In other words, by repeating the operation described above, the ejection head (31A) is brought into reciprocatory pivotal motion within a pivotal angle of 90 degrees about the vertical axis of rotation, and the chips accumulated within a predetermined range in the interior of the tank body (2) may be blown out and raise by the cutting fluid of a required amount ejected from the ejection port (310) while the ejection head (31A) pivots clockwise in FIG. 4.

Figure 5:
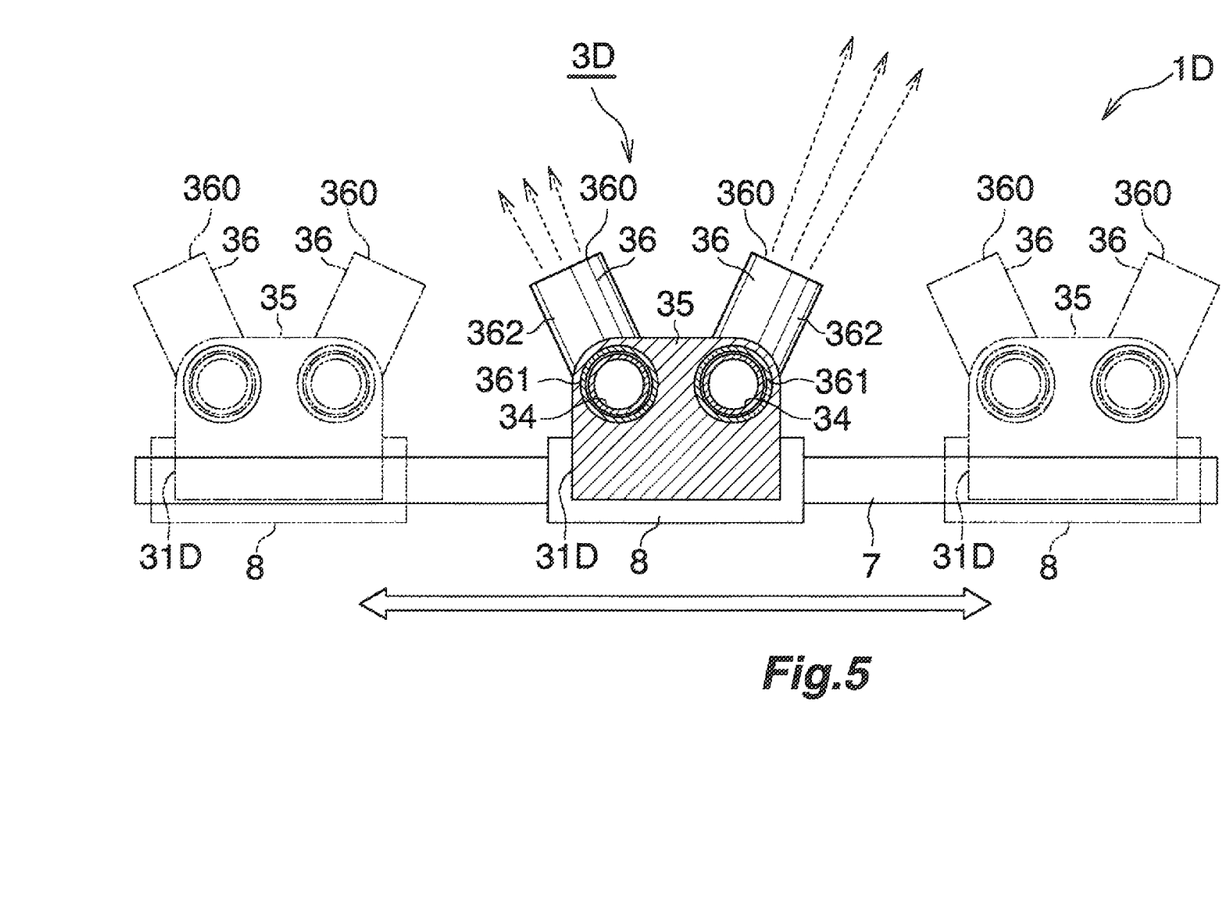
FIG. 5 is a schematic horizontal cross-sectional view illustrating a cutting fluid tank according to a fourth embodiment.

FIG. 5 illustrates a fourth embodiment of the invention.

As illustrated in FIG. 5, in a cutting fluid tank (1D) of the fourth embodiment, a fluid ejection apparatus (3D) is provided with an ejection head (31D) configured to be allowed to perform reciprocatory motion on a linear rail (7). An ejection head (31C) is provided with two ejection ports (360) directed in different directions from each other.

Specifically, the ejection head (31D) includes a base member (35) fixedly mounted on a movable member (8) movable along the rail (7), and two ejection port members (36) including vertical cylindrical portions (361) penetrating through the base member (35) in a vertical direction and projecting at a lower end thereof from a lower surface of the base member (35) and lower horizontal cylindrical portions (362) extending radially outwardly from the lower ends of the vertical cylindrical portions (361). The ejection ports (360) are defined by openings at distal ends of the lower horizontal cylindrical portions (362) of the two ejection port members (36). Both of the ejection port members (36) are arranged in a line along a direction of motion of the ejection head (31C). Both of the ejection port members (36) are provided in a direction not orthogonal to a longitudinal direction of the rail (7), specifically, one of the ejection ports (360) is directed upper left in FIG. 5, and the other ejection port (360) is directed upper right in FIG. 5.

Part of the ejection fluid supply tubes (34) is inserted into the vertical cylindrical portions (361) of the ejection port members (36), and in the same manner as the first embodiment, part of the cutting fluid stored in the interior of the tank body is pumped up by a pump and is supplied as ejection fluid.

A ratio of flow rates of the cutting fluid ejected from the two ejection ports (360) varies with time. It is achieved, for example, by operating respective pumps configured to supply the cutting fluid to two of the ejection port members (36) intermittently or by operating the pumps in such a manner that the flow rates repeat an increase and a decrease by a flow rate control apparatus and by shifting timing of the operations of the respective pumps. Alternatively, a configuration in which the quantity of cutting fluid discharged from one pump is distributed by two ejection port members and the distribution ratio is varied is also applicable.

For example, in the case where the flow rate of the cutting fluid ejected from the ejection ports (360) on the right side in FIG. 5 is high, and the flow rate of the cutting fluid ejected from the ejection ports (360) on the left side in FIG. 5 is low, the ejection head (31D) is moved leftward in FIG. 5 on the rail (7) by a difference in reactive force therebetween. In contrast, in the case where the flow rates of two of the ejection ports (360) are vice versa, the ejection head (31D) is moved rightward in FIG. 5 on the rail (7). By repeating this motion, the ejection head (31D) is caused to perform reciprocatory motion on the rail, and required quantity of the cutting fluid is ejected from the two ejection ports (360) directed in different directions alternately between one direction and the other.

Therefore, by installing the fluid ejection apparatus (3D), for example, at a position along an outer peripheral wall or a partitioning wall in the interior of the tank body and ejecting the cutting fluid, the chips accumulated on the bottom portion over a wide range in the interior of the tank body are blown out and raised by a jet flow. By separating and removing the raised chips by the chip separating apparatus on the downstream side, accumulation of the chips is effectively prevented.

The shape of the rail used for moving the ejection head is not limited to a linear shape as illustrated in FIG. 5, and any suitable shape may be used. For example, a closed loop-shape is also applicable. The number of the ejection ports to be provided on the ejection head is not limited to two, and three or more of those may also be provided. In addition, when forming the rail shape into a closed loop-shape, a configuration in which one ejection port is provided to allow only cyclical motion is also applicable. Furthermore, a configuration in which the ejection port member is rotatable or pivotable and the direction of the ejection port is varied with time is also applicable in the same manner as the cases of the first to the third embodiments.

In the embodiments described above, part of the cutting fluid stored in the interior of the tank body is used as fluid to be ejected by the fluid ejection apparatus. However, for example, air may also be used as well.

What is claimed is:

1. A cutting fluid tank comprising:
   a tank body having stored therein cutting fluid containing chips, the cutting fluid containing the chips discharged from a work portion of a machine tool and flowed into the interior of the tank body at a predetermined inflow position;
   a cutting fluid supply device provided in the interior of the tank body and configured to supply the cutting fluid in the interior of the tank body toward the work portion of the machine tool; and
   a fluid ejection device provided in the interior of the tank body and configured to eject fluid toward cutting fluid containing chips, to be capable of varying at least one of a direction and a position of ejection with time and to blow out and raise the chips accumulated on a bottom of the tank body by a jet flow in order to go with a flow of the cutting fluid containing the chips from the inflow position to the cutting fluid supply device.

2. The cutting fluid tank according to claim 1, wherein the fluid ejection device includes an ejection head having an ejection port and provided in the interior of the tank body so as to allow predetermined motion, and at least one of a direction and a position of the ejection port is varied with time by motion of the ejection head.

3. The cutting fluid tank according to claim 2, wherein a reaction force of the fluid ejected from the ejection port is used as at least part of a drive force that moves the ejection head.

4. The cutting fluid tank according to claim 3, wherein the motion of the ejection head is a rotary motion about a predetermined axis of rotation, the ejection port is at a twisted position with respect to the axis of rotation of the ejection head, and the ejection head is rotated by the reaction force of the fluid ejected from the ejection port.

5. The cutting fluid tank according to claim 4, wherein the fluid ejected by the fluid ejection device is part of the cutting fluid stored in the tank body.

6. The cutting fluid tank according to claim 4, wherein the fluid ejected by the fluid ejection device is air.

7. The cutting fluid tank according to claim 4, wherein the ejection head includes a vertical cylindrical portion provided inside a fixed retaining cylinder via a bearing so as to be rotatable about a vertical axis of rotation, a lower horizontal cylindrical portion extending radially outward from a lower end of the vertical cylindrical portion, a bent end portion bent shortly from a distal end of the lower horizontal cylindrical portion in a horizontal direction orthogonal to an axial direction of the lower horizontal cylindrical portion, and the single ejection port is constituted by an opening of the bent end portion.

8. The cutting fluid tank according to claim 3, wherein the motion of the ejection head is a reciprocatory pivotal motion within a predetermined pivotal angle, a biasing device configured to bias the ejection head toward one of directions of pivotal motion is provided, the ejection port is provided so as to allow the reaction force of the ejected fluid to act in a direction opposite to that of the biasing force applied by the biasing device, and the ejection head is brought into reciprocatory pivotal motion by a quantity of the fluid ejected from the ejection port being varied with time.

9. The cutting fluid tank according to claim 8, wherein the fluid ejected by the fluid ejection device is air.

10. The cutting fluid tank according to claim 3, wherein the motion of the ejection head is reciprocatory motion or cyclical motion on a predetermined locus, the ejection head includes two or more ejection ports different in direction from each other, the ejection head is brought into reciprocatory motion or cyclical motion on the locus by varying a ratio of the quantities of the fluid to be ejected from the respective ejection ports with time.

11. The cutting fluid tank according to claim 3, wherein the motion of the ejection head is cyclical motion on the predetermined locus, the ejection port is installed in a direction not orthogonal to the locus, and the ejection head is brought into cyclical motion by the reaction force of the fluid ejected from the ejection port.

12. The cutting fluid tank according to claim 3, wherein the fluid ejected by the fluid ejection device is part of the cutting fluid stored in the tank body.

13. The cutting fluid tank according to claim 3, wherein the fluid ejected by the fluid ejection device is air.

14. The cutting fluid tank according to claim 2, wherein the drive force for causing the ejection head into motion is generated by an external drive source.

15. The cutting fluid tank according to claim 14, wherein the fluid to be ejected from the ejection port is part of the cutting fluid stored in the tank body, and the external drive source is a hydraulic motor operated by a flowing force of the cutting fluid supplied from the tank body into the ejection port.

16. The cutting fluid tank according to claim 2, wherein the fluid ejected by the fluid ejection device is part of the cutting fluid stored in the tank body.

17. The cutting fluid tank according to claim 2, wherein the fluid ejected by the fluid ejection device is air.

18. The cutting fluid tank according to claim 1, wherein the fluid ejected by the fluid ejection device is part of the cutting fluid stored in the tank body.

19. The cutting fluid tank according to claim 1, wherein the fluid ejected by the fluid ejection device is air.

20. The cutting fluid tank according to claim 1, wherein means for separating and removing the chips from the cutting fluid is provided on the downstream side of the flow of the cutting fluid containing the chips from the inflow position to the cutting fluid supply device in the interior of the tank body.

* * * * *